US 6,697,556 B1

(12) United States Patent
Militaru et al.

(10) Patent No.: US 6,697,556 B1
(45) Date of Patent: Feb. 24, 2004

(54) METHOD FOR SECTION REDUCING A STEEL TUBE TO ACHIEVE EXCESS FIBER LENGTH OF AN ELONGATE BUNDLE OF OPTICAL FIBERS CONTAINED WITHIN THE TUBE

(75) Inventors: Cristian I. Militaru, Duncan, SC (US); Mark A. Garner, Duncan, SC (US)

(73) Assignee: Alcoa Fujilura Limited, Franklin, TN (US)

( * ) Notice: Subject to any disclaimer, the term of this patent is extended or adjusted under 35 U.S.C. 154(b) by 0 days.

(21) Appl. No.: 10/245,150

(22) Filed: Sep. 17, 2002

(51) Int. Cl.⁷ .................................................. G02B 6/44
(52) U.S. Cl. .......................................... 385/100; 72/226
(58) Field of Search ........................ 385/100–113, 147; 72/199, 226

(56) References Cited

U.S. PATENT DOCUMENTS

| | | | |
|---|---|---|---|
| 4,157,213 A | * 6/1979 | Phillips | |
| 4,477,147 A | 10/1984 | Winter et al. | 350/96.23 |
| 4,640,576 A | 2/1987 | Eastwood et al. | 350/96.23 |
| 4,966,434 A | 10/1990 | Yonechi et al. | 350/96.23 |
| 4,983,333 A | 1/1991 | Blew | 264/1.5 |
| 5,022,634 A | 6/1991 | Keeble | 254/134.4 |
| 5,234,198 A | 8/1993 | Hale et al. | 254/134.4 |
| 5,289,556 A | 2/1994 | Rawlyk et al. | 385/112 |
| 5,325,457 A | 6/1994 | Bottoms, Jr. et al. | 385/113 |
| 5,358,218 A | 10/1994 | Terasawa et al. | 254/134.4 |
| 5,838,864 A | 11/1998 | Patel et al. | 385/113 |
| 5,923,802 A | 7/1999 | Giebel et al. | 385/76 |

* cited by examiner

Primary Examiner—Khiem Nguyen
(74) Attorney, Agent, or Firm—Tracey D. Beiriger

(57) ABSTRACT

A method for section reducing an encasing tube to achieve excess length of fibers within the tube. At least one, and preferably two, platforms are arranged at a selected angular offset. Each platform includes a first plurality of rollers mounted in stationary, linear and spaced apart fashion. A second plurality of rollers are mounted in an adjustable, linear spaced apart and opposing fashion relative the associated first plurality of rollers. Upon the tube passing between the stationary and adjustable rollers associated with each platform, the rollers associated with each platform simultaneously contacting first and second cross sectional locations of the tube and in order to apply lateral compressing forces to the tube which decrease its gauge length, corresponding to increasing its gauge thickness. The additional increase in excess fiber length (EFL) is due to the fact that, even if the fiber length remains the same within a "gauge" length, the "gauge" length of the tube will decrease, after going through the system of straightening rollers, from an initial value, in front of the rollers, to a shorter "final" value, after the rollers.

16 Claims, 4 Drawing Sheets

122

| Straightening Roller Number | Thickness<br><br>t [mm] | Thickness Increase<br><br>dt [%] | Gauge Length<br><br>L [mm] | Gauge Length Decrease<br><br>dL [%] | Comments |
|---|---|---|---|---|---|
| 0 | 0.20000 | 0.00 | 1000.0 | 0.00 | Initial |
| 1 | 0.20021 | 0.10 | 999.4 | -0.06 | Vertical Plane 5 Rollers |
| 2 | 0.20033 | 0.16 | 999.1 | -0.09 | |
| 3 | 0.20042 | 0.21 | 998.9 | -0.11 | |
| 4 | 0.20048 | 0.24 | 998.7 | -0.13 | |
| 5 | 0.20054 | 0.27 | 998.5 | -0.15 | |
| 6 | 0.20058 | 0.29 | 998.4 | -0.16 | Horizontal Plane 5 Rollers |
| 7 | 0.20062 | 0.31 | 998.3 | -0.17 | |
| 8 | 0.20066 | 0.33 | 998.2 | -0.18 | |
| 9 | 0.20069 | 0.35 | 998.1 | -0.19 | |
| 10 | 0.20072 | 0.36 | 998.0 | -0.20 | Final |

*Fig-7*

$$124 \quad \Delta t_n = \frac{t_n - t_0}{t_0} \cdot 100$$

$$126 \quad \Delta L_n = \frac{L_n - L_0}{L_0} \cdot 100$$

US 6,697,556 B1

METHOD FOR SECTION REDUCING A STEEL TUBE TO ACHIEVE EXCESS FIBER LENGTH OF AN ELONGATE BUNDLE OF OPTICAL FIBERS CONTAINED WITHIN THE TUBE

FIELD OF THE INVENTION

The present application relates generally to fiber optic bundles contained within a stainless steel tube and in particular the desire to obtain a specified excess fiber length of the optic bundles from either or both extending ends of the tubes. More specifically, the present invention discloses a method with attached mathematical equations and special process techniques for section reducing the encasing stainless steel tube (i.e., decreasing gauge length concurrent with increasing gauge thickness) using straightening rollers in order to achieve the desired excess fiber length of the associated optic bundle and in order to provide sufficient tensile and compressive operating characteristics such as in aerial cable operations.

BACKGROUND OF THE INVENTION

The prior art is well documented with examples of fiber optic tube feeding devices and processes, and those in particular in which a bundle of optic fibers are fed into an outer tube, such as is constructed of a stainless steel or other suitable environmentally insulating and/or electrically conductive jacketing material.

An objective in the manufacture of fiber optic bundles within their associated outer tubing is the creation of an excess length of the fiber strands at either or both terminating ends of the outer tubing. This is accomplished in one application by the overfeeding of the fibers into the tube, and such as again during the manufacture of the tube.

A shortcoming which has been determined to result from conventional overfeeding of the fiber bundles is that the bundle often does not exhibit sufficient tensile and compressive ratings for certain aerial cable applications, this often being due to an insufficient amount of excess fiber length (EFL) resulting from such conventional overfeeding applications. It has further been determined that, under extreme external loading cases, e.g. such as wind and ice, forces in the range of 60–80% of the rated breaking strength (RBS) of the cable are often achieved. For these particular aerial cable applications, it is required that the optical fibers in the cable are not strained at these heightened load conditions. The present invention process technique, using a system of straightening rollers, will make the cable to comply with this requirement, by providing an additional excess fiber length (EFL), not possible of obtaining through overfeeding techniques alone.

A further example of a process and apparatus for controlling the feed (overfeed) of a plurality of optical fibers within a tube, and while the tube is being formed, is illustrated in U.S. Pat. No. 4,640,576, issued to Eastwood. The process in Eastwood includes the steps of propelling a plurality of fibers into the tube with a sufficient force to move the fibers at a speed faster than the speed at which the tube is formed. Eastwood also teaches regulating the excess length of fiber by restraining the feed at a predetermined ratio with respect to the speed at which the tube is being formed.

Another example of an apparatus for installing optical fiber in a conduit is disclosed in U.S. Pat. No. 5,234,198, issued to Hale, and which teaches a ribbon of optical fiber introduced into a conduit (such as a duct) and including the use of a pressurized liquid transporting medium. The liquid transporting medium is effective to cause the optical fiber to be moved along in the conduit to cause a leading end of the fiber to emerge from a far end of the conduit and be accessible for connective arrangement.

SUMMARY OF THE INVENTION

The present invention discloses a novel method, with attached mathematical equations and a special process technique for section reducing an encasing stainless steel tube using a straightening roller assembly (i.e., decreasing gauge length concurrent with increasing gauge thickness) in order to achieve the desired excess fiber length of the associated optic bundle and in order to provide sufficient tensile and compressive operating characteristics such as in aerial cable operations. It is also understood that the tube gauge length decrease using the roller assembly may work in combination with existing and known overfeed techniques and in order to impart an extra desired degree of excess fiber length (EFL) than that which is possible through the use of overfeed techniques alone, while increasing a region of zero fiber strain established inside the tube and to thereby increase a maximum rated cable load under extreme loading conditions.

The present invention operates through the provision of either a single or, preferably, a pair of first and second planar shaped platforms arranged in adjoining and angular offsetting fashion relative to one another. Each of the platforms includes a first plurality, preferably first, second and third, of stationary mounted and spaced apart rollers. A second plurality, preferably first and second, adjustable rollers are likewise mounted in linear and spaced apart fashion and so that they oppose the first plurality of stationary rollers of each associated platform.

The further advantage of employing first and second platforms is so that appropriately configured and recessed grooves, associated with each plurality of rollers of a designated platform, contacts a selected cross sectional location of the tube (along its axial extending length). In combination, the rollers apply a lateral contact pressure along the tube in order to decrease a gauge length associated with the tube, while correspondingly increasing a gauge thickness of the tube to thereby cause excess fiber to extend from either or both ends of the tube.

Additional features include the provision of a coil biasing spring for each adjustable roller and which ideally seats within a channel defined in the associated platform and in perpendicular extending fashion relative to the linear travel direction of the tube and fiber bundle. An adjustment screw is also provided for each biasing spring and, upon rotation in a specified direction, establishes a desired contacting position and biasing force of the roller. As also explained previously, a single plane roller assembly can also be utilized by itself and within the scope of the invention.

The additional increase in excess fiber length (EFL) is due to the fact that, even if the fiber length remains the same within a "gauge" length, the "gauge" length of the tube will decrease, after going through the system of straightening rollers, from an "initial" value, in front of the rollers, to a shorter "final" value, after the rollers.

The range of additional excess fiber length (EFL), in percentage, that can be obtained through this novel technique, is controlled by a range of lateral deformation, in tenths of millimeters, that is applied to the tube. The lateral deformation range is controlled by a range of lateral contact pressure applied on the tube by the rollers, through the coil spring system.

The physical explanation for this phenomenon is that the system of straightening rollers, through the lateral pressure exercised, gradually, up to 360 degrees, all the way around the tube, will determine a small reduction of the material in the axial direction, in "length", and a very small increase in the transverse direction, in "thickness". The small reduction in "length" of the tube is transferred in an very small increase in "thickness" of the tube. When the tube travels first, through the system of vertical rollers, there is, first, a lateral contact pressure exercised on 2 points: top ("North") and bottom ("South"). When the tube, subsequently, travels through the system of horizontal rollers, a lateral contact pressure is exercised on another 2 points: "West" and "East", on the 2 lateral sides of the tube. In the end, after going through both the vertical and horizontal system of straightening rollers, the tube will be under lateral contact pressure, in 4 points, located all the way around its circumference, 90 degrees apart.

Both the reduction in the axial direction and the increase in the transverse direction are in the order of a few tens of a percent. In absolute values, the reduction in the axial direction represents a few millimeters in 1 m gauge length, while the increase in the traverse direction represents a few (such as 1–9) tenths of a micron.

This novel technique of obtaining excess fiber length (EFL) in steel tubes will determine a substantial increase in fiber tensile window (region without fiber strain) inside the steel tube, and it will determine a substantial increase in the value of Cable Tension with Zero Fiber Strain (CTZFS) and in the value of Maximum Rated Cable Load (MRCL), under extreme external loading cases: wind and ice, required in some specific aerial cable applications.

This novel technique of obtaining excess fiber length (EFL) in steel tubes will determine also a high extension in the application possibilities of the optical groundwire design with just one "central" tube, also called "unitube" design, instead of using the more expensive "stranded" tube designs, in which the necessary fiber tensile window (region without fiber strain) is obtained using the lay length (the pitch) of the tube.

BRIEF DESCRIPTION OF THE DRAWINGS

Reference will now be made to the attached drawings, when read in combination with the following detailed description, wherein like reference numerals refer to like parts throughout the several views, and in which:

FIG. 7 is a tabular depiction of the factors including, tube thickness, percentage thickness increase, gauge length, and gauge length decrease, once again along the progression from the first roller of the first plane system through the tenth and final roller of the second plane system.

DETAILED DESCRIPTION OF PREFERRED EMBODIMENTS

Figure 1:
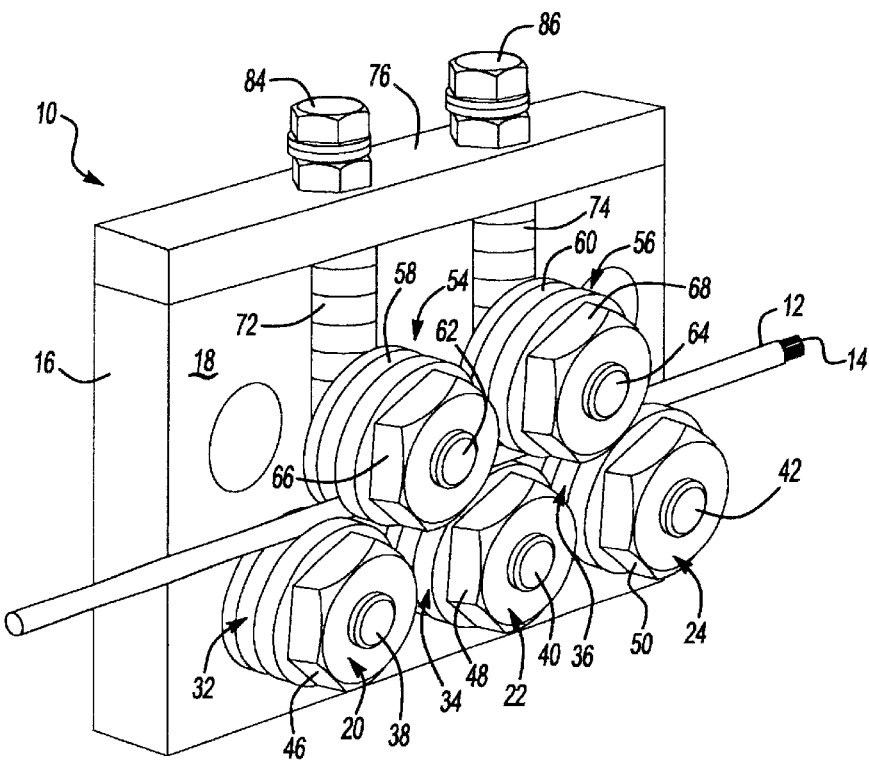
FIG. 1 is a perspective view of a one plane system of three fixed and two baisingly movable rollers incorporated into an overall assembly and through which is fed a stainless steel tube encapsulating a bundled strand of optic fibers according to a first preferred embodiment of the present invention.

Referring now to FIG. 1, a straightening roller assembly is disclosed at 10 according to a first preferred embodiment of the method of the present invention for section reducing an encasing stainless steel tube 12 (i.e., decreasing gauge length concurrent with increasing gauge thickness) in order to achieve a desired excess fiber length of an associated optic bundle 14 held within the tube 12, such as in order to provide sufficient tensile and compressive operating characteristics in aerial cable installations. The present invention is further intended, in certain applications, to be utilized in combination with other prior art techniques for establishing excess fiber length, such as again including "overfeeding" of the fibers within the outer tube.

Referring again to FIG. 1, the assembly 10 includes a platform 16 exhibiting a three dimensional shape with a specified planar surface 18. A first plurality of rollers 20, 22 and 24, are mounted to the platform in stationary, linear and spaced apart fashion. Each of the rollers, referring specifically to second roller 22 illustrated in side cutaway of FIG. 3 includes a recessed groove extending in annular fashion therearound.

Figure 3:
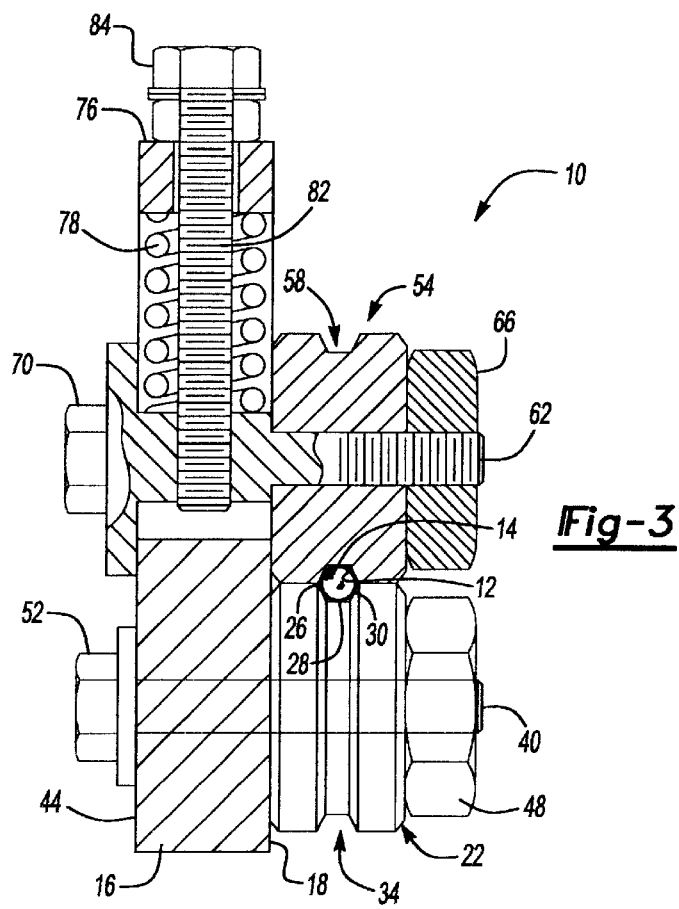
FIG. 3 is a cutaway view taken along line 3—3 of FIG. 2 and illustrating from a side profile the straightening rollers according to the present invention.

As again best illustrated in the cross sectional cutaway of FIG. 3, each roller includes a polygonal shaped configuration defined by first 26, second 28 and third 30 interconnecting sides. Referencing once again FIG. 1, recessed grooves 32, 34 (see again interconnecting sides 26, 28 and 30 in FIG. 3) and 36 are therefore generally shown for each of rollers 20, 22 and 24 respectively. It should also be pointed out that the cross sectional configuration of each groove is according to the desire of one skilled in the art and may include any number of sides.

Also illustrated are pins 38, 40 and 42 (see again FIG. 1), corresponding to rollers 20, 22 and 24, the pins being secured to the platform by fastening nuts located on both the front 18 and rear 44 (see FIG. 3) faces of the platform 16 and about which the rollers are mounted in their desired stationary and rotating fashion. Front facing fastening nuts are illustrated at 46, 48 and 50, in corresponding fashion to the rollers 20, 22 and 24 (again FIG. 1). As best shown in FIG. 3, a selected and rear facing nut 52 is illustrated in adhering fashion along the rear facing surface 44 of the platform 16 and, in combination with the associated front facing nut 48 and extending pin 40, holds the associated roller 22 in its desired stationary position. It is further understood that, while not shown in the frontal views of FIGS. 1 and 2, corresponding rear facing nuts are provided for securing in place each of the stationary rollers 20, 22 and 24.

Referring again to FIGS. 1-3, a second plurality of rollers 54 and 56 are mounted in likewise projecting fashion from the front facing surface 18 of the platform 16 in an adjustable, linear and spaced apart fashion. The adjustable rollers 54 and 56 are, as illustrated, arranged in an opposing and linearly offsetting fashion relative to the stationary rollers 20, 22 and 24 and so that, as will be further discussed in more detail, the appropriate lateral contact pressure and compression is applied to the tube 12 upon being fed therethrough.

As with the first plurality of stationary rollers 20, 22 and 24, the adjustable rollers 54 and 56 each further include recessed grooves, see at 58 and 60, respectively, the grooves further including the same multi-sided cross sectional configuration as evidenced by the selected groove 34 associated with the stationary roller 22. Also included are pins 62 and 64 for rotatably supporting the rollers 54 and 56, as well as front facing nuts 66 and 68 (FIG. 1) and rear facing nuts (see at 70 in FIG. 3 for selected roller 54) for supporting the pins in place.

It is also desirable to permit the adjustable rollers 54 and 56 to move in angularly offsetting directions both towards and away from the linear extending path of the tube 12 and this is accomplished by channels, see at 72 and 74, extending within the platform interior (again referencing FIGS. 1–4). In the preferred variant, the channels 72 and 74 each extend in substantially perpendicular fashion from a corresponding top edge (see at 76) of the platform 16 to the travel path of the steel tube 12; it being further understood that the channels may extend in any angularly offsetting fashion relative to the travel path of the tube and without departing from the scope of the invention.

Figure 2:
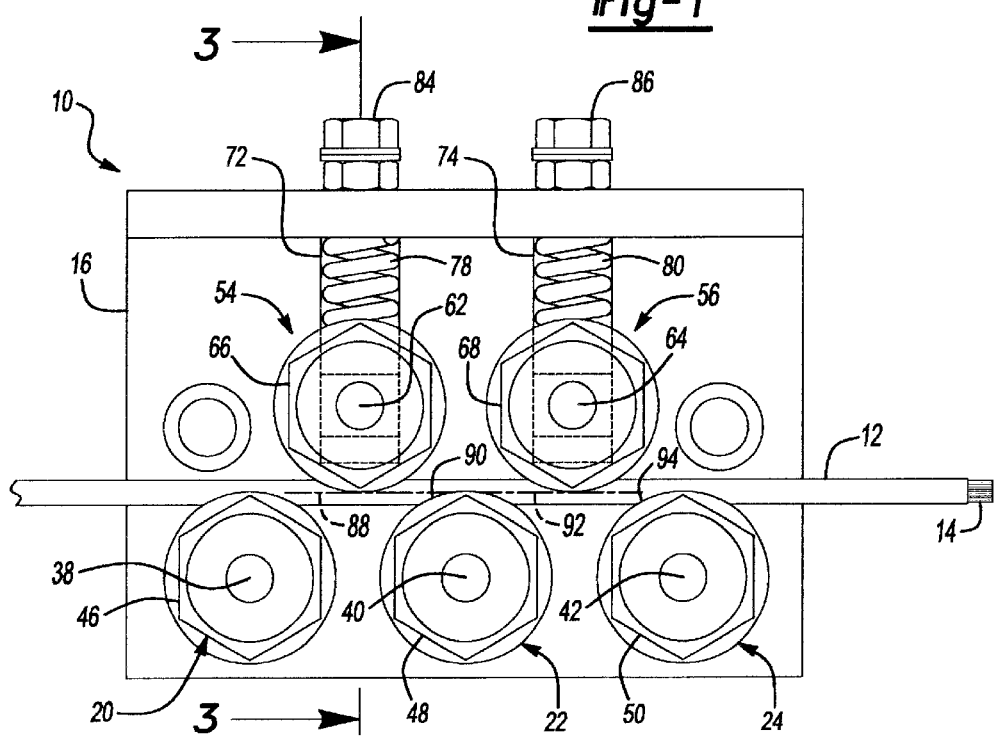
FIG. 2 is a front view of the one plane system illustrated in FIG. 1, in partial cutaway, and exhibiting the spring biasing nature of the pair of movable rollers.

Seated within each channel is a coil spring, see at 78 and 80 and corresponding to each of the adjustable rollers 54 and 56 (see again FIG. 2). As best shown again in reference to the side cutaway view of FIG. 3, the selected spring 78 biases at a first end in proximity to the top 76 of the platform, and at a second end proximate the communicating path location of the tube 12. A pin 82 extends within the interior of coil spring 78 and engages, in crosswise fashion, the pin 62.

In this manner, the adjustable roller 54 is biased in a direction towards the spatially offset and opposing stationary rollers 20 and 22, the further adjustable roller 56 being likewise biased between the offsetting stationary rollers 22 and 24 (again FIGS. 1 and 2). An adjustment mechanism, in the form of screws 84 and 86 (see again FIGS. 1–4), is utilized to selectively increase or decrease the biasing force and contacting position of the associated rollers 54 and 56 relative to the linear travel path of the steel tube 12, rotation of the screws in either of first or second directions either increasing or decreasing the force applied by the associated roller.

In use, and upon the steel tube 12 with encased bundle of fibers 14 being fed in linearly extending fashion between the stationary 20, 22 and 24 and adjustable 54 and 56 rollers, the first and second pluralities of rollers simultaneously contact opposite top and bottom cross sectional locations of the tube 12 (see FIG. 3 cutaway) and to thereby apply a lateral contacting and compressing force at selected axial locations. These locations are represented at 88, 90, 92 and 94 in FIG. 2 and, upon occurrence, decrease a gauge length associated with the tube 12, while correspondingly increasing a gauge thickness causing the excess fiber length to extend from at least one of first and second ends of the tube.

As previously explained, the additional increase in excess fiber length (EFL) is due to the fact that, even if the fiber length remains the same within a "gauge" length, the "gauge" length of the tube will decrease after going through the system of straightening rollers. This is from an "initial" value, prior to the rollers, to a shorter "final" value, following the rollers. The range of additional excess fiber length (EFL), in percentage, that can be obtained thorough this novel technique is controlled by a range of lateral deformation, in tens of millimeters, that is applied to the tube. The lateral deformation range is controlled by a range of lateral contact pressure applied on the tube by the rollers, through the coil spring system (springs 78 and 80). Both the reduction in the axial direction and the increase in the transverse direction are in the order of a few tens of a percent. In absolute values, the reduction in the axial direction represents a few millimeters in 1 m gauge length, while the increase in the transverse direction represents a few tenths of a micron.

It is also understood that, while illustrating a plurality of three stationary and two adjustable rollers, totaling five rollers, any plurality of fixed and stationary rollers can be utilized with the platform 10.

Figure 4:
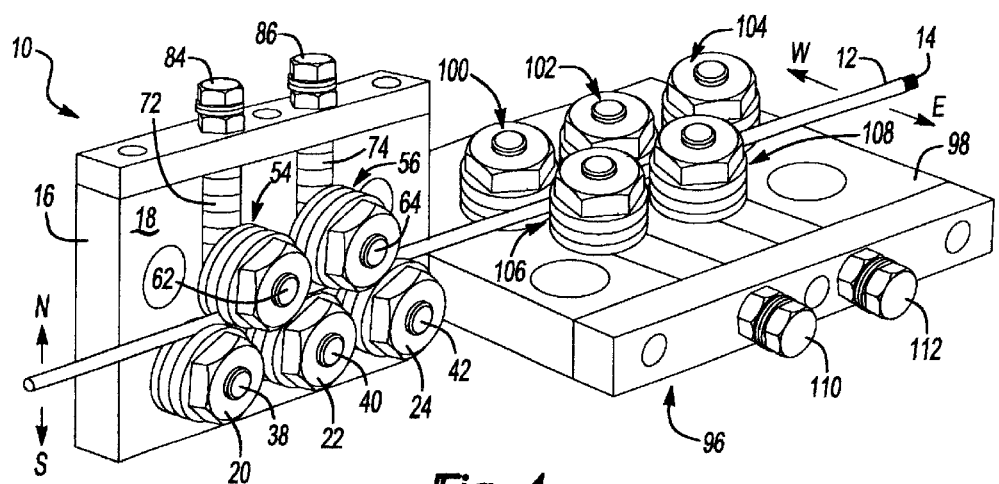
FIG. 4 is a perspective view of a two-plane system of succeeding vertical and ninety degree offset and horizontal rollers systems for further straightening and section reducing the steel tube.

Referring to FIG. 4, the straightening roller assembly is illustrated according to a further preferred embodiment and which again illustrates the assembly 10 in use in combination with a second adjoining assembly 96. In this embodiment, the second assembly 96 is constructed in identical fashion to the first assembly 10 and includes a platform 98, stationary rollers 100, 102, 104, adjustable rollers 106 and 108 and biasing adjustment screws 110 and 112 associated with the rollers 106 and 108. Accordingly, additional explanation of the second assembly 96 is unnecessary in view of the detailed description given as to the primary assembly in FIGS. 1–3.

Referencing again FIG. 4, and in the preferred embodiment, the platform 98 associated with the second assembly is arranged in an angular offsetting, preferably ninety degree offsetting, fashion relative to the primary or initial platform 16. The purpose for the offsetting nature of the second platform 98 is so that, upon feeding of the steel tube 12 with encased bundle of fibers 14 between the stationary and adjustable rollers associated with each of the platforms, the first and second pluralities of rollers associated with the first platform simultaneously contacting first ("Top" or "North", See FIG. 4) and second ("Bottom" or "South", See FIG. 4) cross sectional locations of the tube, whereas the first and second pluralities of rollers associated with the second platform subsequently contacting third ("Left" or "West", See FIG. 4) and fourth ("Right" or "East", See FIG. 4) cross sectional locations of the tube. In this manner, the rollers apply a lateral contacting and compressing force at selected axial locations along the tube in order to decrease a gauge length associated with the tube, a corresponding gauge thickness of the tube being increased, thereby causing the excess fiber length to extend from at least one of first and second ends of the tube.

Figure 5:
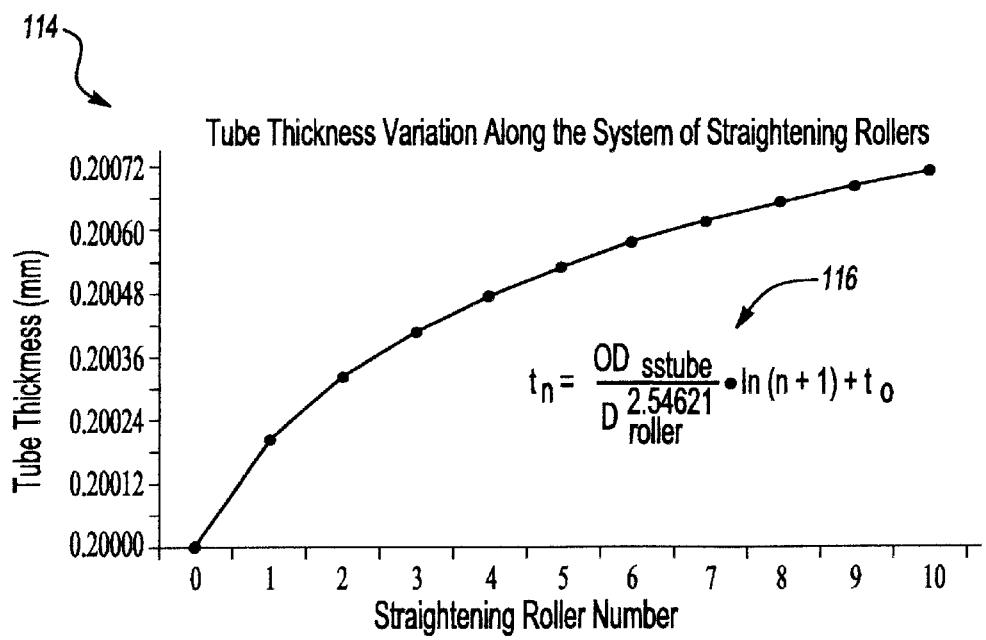
FIG. 5 is a first graphical illustration of the steel tube thickness variation (increasing in mm) along the system of the straightening rollers, i.e., along the progression from the first roller of the first plane system through the tenth and final roller of the second plane system.
Figure 6:
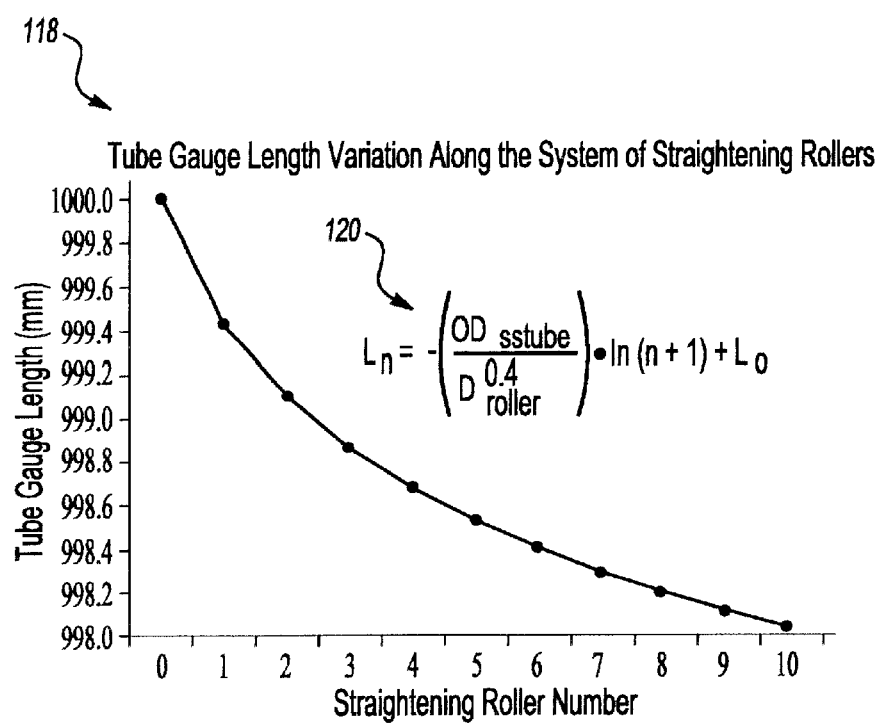
FIG. 6 is a second graphical illustration of the tube gauge length variation (inversely decreasing in mm) along the system of straightening rollers, i.e., once again along the progression from the first roller of the first plane system through the tenth and final roller of the second plane system.

Having provided a sufficiently detailed structural description of the straightening roller assembly, according to either the embodiments of FIGS. 1–3 and FIG. 4, reference will now be had to a series of graphical illustrations shown in FIGS. 5–7 and which illustrates various performance characteristics indicative of the two plane roller assembly of FIG. 4. In each graphical representation, a stainless steel tube 12 is provided according to one preferred example and such as exhibiting an initial outer diameter of 3.60 mm (designated as "$OD_{sstube}$"), an initial thickness of 0.20 mm (designated as "$t_o$"), and an initial gauge length of 1000 mm (designated as "$L_o$") before entering the roller system (each roller number designated as "n", where "n"=1,2,3 . . . 10), with each roller diameter of 40 mm (designated as "$D_{roller}$").

FIG. 5 illustrates at 114 a first graphical illustration of the steel tube thickness variation (increasing in mm) along the system of the straightening rollers, i.e., along the progression from the first roller (n=1) of the first plane system through the tenth (n=10) and final roller of the second plane system. Referring again to FIG. 4, the first roller is understood to reference stationary roller 20, the second roller referencing adjustable roller 54, and so on in alternating fashion concluding with the tenth roller referencing stationary roller 104. Also (see again FIG. 5) referenced at 116 is the equation which has been determined for calculating tube thickness increase (in mm) following each roller, using the above parameters "$OD_{sstube}$", "$D_{roller}$", "$t_o$", and "n". This equation follows a positive logarithmic function.

Referring now to FIG. 6, a second graphical illustration is referenced at 118 of the tube gauge length variation (inversely decreasing in mm) along the two plane system of straightening rollers, i.e., once again along the progression from the first roller (n=1) of the first plane system through the tenth (n=10) and final roller of the second plane system. In Fig.6, referenced at 120 is the equation which has been determined for calculating tube gauge length decrease (in mm), following each roller, using the above parameters: "$OD_{sstube}$", "$D_{roller}$", "$L_o$", and "n". This equation follows a negative logarithmic function.

Finally, and referring to FIG. 7, a tabular depiction is shown at 122 of the factors including, tube thickness increase, percentage tube thickness increase, tube gauge length decrease, and percentage tube gauge length decrease, once again determined along the progression of the tube from the first roller 20 (n=1) of the first plane system through the tenth and final roller 104 (n=10) of the second offsetting plane system. Finally (see again FIG. 7) illustrated at 124 and 126 are the equations corresponding to the percentage changes in tube thickness increase and tube gauge length decrease, respectively, which calculate these values in progressing fashion from the first (n=1) through the tenth (n=10) and final roller.

In view of the above explanation of the straightening roller assembly, the method of the present invention for obtaining additional excess length of optical fibers contained within the steel tube, and through the application of the straightening roller system as described above, includes the steps of passing the tube in an axially progressive fashion between first and second pluralities of rollers arranged in opposing, spaced apart and axially offsetting fashion, applying a lateral contacting and compressing force to at least one axially spaced location of the tube in order to decrease a gauge length associated with the tube and so that a gauge thickness of the tube is correspondingly increased and thereby causes the excess fiber length to extend from at least one of first and second ends of the tube.

Additional steps include spring biasing a first selected plurality of the rollers in a direction towards the other selected plurality of rollers, as well as providing a first system incorporating first and second pluralities of rollers in a first defined plane, and a second and succeeding system incorporating first and second pluralities of rollers in a second defined plane. The first system applies lateral contacting and compressing forces to first and second locations of the tube, whereas the second and subsequent system applies lateral contacting and compressing forces to third and fourth locations of the tube.

Having described my invention, additional preferred embodiments will become apparent to those skilled in the art to which it pertains, and without deviating from the scope of the appended claims. For example, any number of individual roller systems, ranging from either a single or dual plane system, to a greater plurality of angularly offsetting planar roller assemblies, can be utilized within the scope of the invention and the breadth of the appended claims.

What is claimed is:

1. A method for section reducing an encasing tube in order to achieve an excess length of a bundle of fibers associated with the tube, said method comprising the steps of:

passing the tube in an axially progressive fashion between first and second pluralities of rollers arranged in opposing, spaced apart and axially offsetting fashion; and applying a lateral contacting and compressing force to at least one axially spaced location of the tube in order to decrease a gauge length associated with the tube, a gauge thickness of the tube being correspondingly increased and thereby causing the excess fiber length to extend from at least one of first and second ends of the tube.

2. The method as described in claim 1, further comprising the step of spring biasing a first selected plurality of rollers in a direction towards the other selected plurality of rollers.

3. The method as described in claim 1, further comprising the step of providing a first system incorporating first and second pluralities of rollers in a first defined plane, a second and succeeding system incorporating first and second pluralities of rollers in a second defined plane.

4. The method as described in claim 3, further comprising the step of said first system applying the lateral contacting and compressing force to first and second locations of the tube, the second system applying a successive lateral contacting and compressing force to third and fourth locations of the tube.

5. The method as described in claim 1, further comprising the step of making the cable to comply with special aerial applications, in which the requirement is that the optical fibers in the cable to have no strain at high levels of tensions: 60 to 80% of the cable rated breaking strength.

6. The method as described in claim 1, said decreasing of said gauge length associated with the tube further comprising the step of decreasing said gauge length from an initial value prior to passing between said first and second pluralities of rollers to a final value after said rollers.

7. The method as described in claim 1, further comprising the step of laterally deforming said tube in a range of 1–5 tenths of one percent of a material content of the tube.

8. The method as described in claim 1, further comprising the step of laterally deforming said tube about an entire 360° circumference thereof.

9. The method as described in claim 8, said step of reducing said gauge length and increasing said gauge thickness of the tube further comprising the step of incrementally reducing portions of the tube in an axial direction while concurrently increasing portions of the tube in a transverse direction.

10. The method as described in claim 4, said step of applying said lateral contacting and compressing forces to said first, second, third and fourth locations of the tube further comprising the step of said first system exerting lateral contacting pressure at North and South locations, said second system exerting lateral contacting pressure at East and West locations.

11. The method as described in claim 9, further comprising the step of reducing said gauge length in a range of 1–5 millimeters per 1 meter gauge length, as well as further comprising the step of increasing said gauge thickness 1–9 tenths of a micron.

12. The method as described in claim 1, further comprising the step of increasing a region without fiber strain inside the steel tube, said increase resulting in substantial increases in the value of cable tension with zero fiber strain and in the value of a maximum rated cable load under extreme external loading conditions.

13. The method as described in claim 1, further comprising the step of calculating a tube thickness increase (in mm), following passage of the tube through each succeeding roller of said pluralities of rollers, said step of calculating following an equation incorporating the parameters of stainless steel tube outer diameter ($OD_{sstube}$), roller diameter ($D_{roller}$), initial tube thickness ($t_o$), and roller number (n).

14. The method as described in claim 13, said equation for calculating a tube thickness increase further comprising the step of following a positive logarithmic function.

15. The method as described in claim 1, further comprising the step of calculating a tube gauge length decrease (in mm), following passage of the tube through each succeeding roller of said pluralities of rollers, said step of calculating following an equation incorporating the parameters of stainless steel tube outer diameter ($OD_{sstube}$), roller diameter ($D_{roller}$), tube initial gauge length ($L_o$), and roller number (n).

16. The method as described in claim 15, said equation for calculating a tube gauge length decrease further comprising the step of following a negative logarithmic function.

* * * * *